(12) United States Patent
Nishimura

(10) Patent No.: US 11,236,225 B2
(45) Date of Patent: *Feb. 1, 2022

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Shota Nishimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 16/087,244

(22) PCT Filed: Mar. 24, 2017

(86) PCT No.: PCT/JP2017/011998
§ 371 (c)(1),
(2) Date: Sep. 21, 2018

(87) PCT Pub. No.: WO2017/170220
PCT Pub. Date: Oct. 5, 2017

(65) Prior Publication Data
US 2019/0270874 A1   Sep. 5, 2019

(30) Foreign Application Priority Data

Mar. 28, 2016 (JP) .............................. JP2016-064436
Mar. 29, 2016 (JP) .............................. JP2016-066141

(51) Int. Cl.
| | |
|---|---|
| *C08L 27/06* | (2006.01) |
| *B32B 27/40* | (2006.01) |
| *C08K 5/00* | (2006.01) |
| *C08K 5/12* | (2006.01) |
| *C08K 5/1515* | (2006.01) |
| *C08L 83/06* | (2006.01) |
| *C08K 5/10* | (2006.01) |
| *C08K 5/521* | (2006.01) |
| *C08L 83/04* | (2006.01) |
| *B29C 41/20* | (2006.01) |
| *B32B 27/30* | (2006.01) |
| *B29C 41/18* | (2006.01) |
| *B32B 5/18* | (2006.01) |
| *B32B 27/06* | (2006.01) |
| *B32B 27/08* | (2006.01) |
| *B29K 27/06* | (2006.01) |
| *B29K 75/00* | (2006.01) |
| *B29L 31/30* | (2006.01) |

(52) U.S. Cl.
CPC .............. *C08L 27/06* (2013.01); *B29C 41/18* (2013.01); *B29C 41/20* (2013.01); *B32B 5/18* (2013.01); *B32B 27/065* (2013.01); *B32B 27/08* (2013.01); *B32B 27/30* (2013.01); *B32B 27/304* (2013.01); *B32B 27/40* (2013.01); *C08K 5/0016* (2013.01); *C08K 5/10* (2013.01); *C08K 5/12* (2013.01); *C08K 5/1515* (2013.01); *C08K 5/521* (2013.01); *C08L 83/04* (2013.01); *C08L 83/06* (2013.01); *B29K 2027/06* (2013.01); *B29K 2075/00* (2013.01); *B29L 2031/3008* (2013.01); *B32B 2266/0278* (2013.01); *B32B 2327/06* (2013.01); *B32B 2605/003* (2013.01); *C08L 2205/025* (2013.01); *C08L 2205/03* (2013.01); *C08L 2205/06* (2013.01)

(58) Field of Classification Search
CPC .......... C08L 27/06; C08L 83/04; C08L 83/06; C08L 2205/03; C08L 2205/025; C08L 2205/06; C08K 5/10; C08K 5/521; C08K 5/0016; C08K 5/12; B32B 27/30; B32B 2031/3008; B32B 2605/003

See application file for complete search history.

(56) References Cited

U.S. PATENT DOCUMENTS

| | | | |
|---|---|---|---|
| 4,675,356 A | 6/1987 | Miyata | |
| 2010/0272984 A1* | 10/2010 | Hada ...................... | C08K 5/12 428/319.3 |
| 2015/0337204 A1 | 11/2015 | Yamazaki et al. | |
| 2017/0233567 A1 | 8/2017 | Nishimura et al. | |
| 2018/0066120 A1 | 3/2018 | Nishimura | |

(Continued)

FOREIGN PATENT DOCUMENTS

| | | |
|---|---|---|
| CN | 107429025 A | 12/2017 |
| EP | 3266826 A1 | 1/2018 |
| FR | 2730739 A1 | 8/1996 |

(Continued)

OTHER PUBLICATIONS

Machine translation of JP2011173974A, published Sep. 8, 2011.*

(Continued)

*Primary Examiner* — Robert S Jones, Jr.
(74) *Attorney, Agent, or Firm* — Kenja IP Law PC

(57) ABSTRACT

A vinyl chloride resin composition with which an increase in surface gloss can be suppressed even in the case of repeating the molding of a vinyl chloride resin molded product using the same mold and also favorable tensile elongation and low surface stickiness can be ensured is provided. A vinyl chloride resin composition comprises: a vinyl chloride resin; a plasticizer; and a silicone oil, wherein a content of the plasticizer relative to 100 parts by mass of the vinyl chloride resin is 80 parts by mass or more, a content of the silicone oil relative to 100 parts by mass of the plasticizer is 0.01 parts by mass or more, and a predetermined weight reduction rate of the silicone oil is 7.0 mass % or less.

8 Claims, No Drawings

(56) References Cited

U.S. PATENT DOCUMENTS

2019/0270874 A1  9/2019  Nishimura

FOREIGN PATENT DOCUMENTS

| JP | S5188543 | A |  | 8/1976 |  |
|----|----------|---|--|--------|--|
| JP | S59112450 | A |  | 6/1984 |  |
| JP | S61174270 | A |  | 8/1986 |  |
| JP | H05148397 | A |  | 6/1993 |  |
| JP | H08291243 | A |  | 11/1996 |  |
| JP | H08291244 | A |  | 11/1996 |  |
| JP | H108308 | A |  | 1/1998 |  |
| JP | H11302485 | A |  | 11/1999 |  |
| JP | 2000204212 |  | * | 7/2000 | ............... C08K 3/08 |
| JP | 2011173974 | A |  | 9/2011 |  |
| JP | 2012007026 | A |  | 1/2012 |  |
| WO | 2016139959 | A1 |  | 9/2016 |  |
| WO | 2016152085 | A1 |  | 9/2016 |  |

OTHER PUBLICATIONS

Silaplane, Silaplane Reactive Silicones, p. 1, retrieved Apr. 23, 2020 [url: https://www.jnc-corp.co.jp/silicon_products/english/silaplane/mono.html].*

Shin-Etsu, Reactive & Non-Reactive Modified Silicone Fluid, 2009, p. 1-10.*

Jun. 20, 2017, International Search Report issued in the International Patent Application No. PCT/JP2017/011998.

Polyvinyl Chloride, edited by The Division of Polymer Sciences, The Kinki Chemical Society, Japan, 1988, p. 75 I. 10-p. 104, Nikkan Kogyo Shimbun Ltd.

Oct. 2, 2018, International Preliminary Report on Patentability issued in the International Patent Application No. PCT/JP2017/011998.

Oct. 2, 2018, International Preliminary Report on Patentability issued in the International Patent Application No. PCT/JP2017/012001.

Jan. 17, 2020, Office Action issued by the United States Patent and Trademark Office in the U.S. Appl. No. 16/088,747.

Oct. 21, 2019, the Extended European Search Report issued by the European Patent Office in the corresponding European Patent Application No. 17774757.3.

Oct. 21, 2019, the Extended European Search Report issued by the European Patent Office in the corresponding European Patent Application No. 17774758.1.

Sep. 3, 2020, Office Action issued by the United States Patent and Trademark Office in the U.S. Appl. No. 16/088,747.

Aug. 24, 2020, Communication pursuant to Article 94(3) EPC issued by the European Patent Office in the corresponding European Patent Application No. 17774757.3.

May 29, 2020, Office Action issued by the United States Patent and Trademark Office in the U.S. Appl. No. 16/088,747.

Oct. 22, 2020, Office Action issued by the United States Patent and Trademark Office in the U.S. Appl. No. 16/088,747.

May 31, 2021, Communication pursuant to Article 94(3) EPC issued by the European Patent Office in the corresponding European Patent Application No. 17774757.3.

* cited by examiner

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins typically have excellent characteristics such as cold resistance, heat resistance, and oil resistance, and therefore are used for various applications.

Specifically, vinyl chloride resins are used, for example, in the formation of surface skins of automobile interior parts such as automobile instrument panels and door trims. An automobile interior part such as an automobile instrument panel typically has a layered structure in which a foamed polyurethane layer is disposed between a substrate and a surface skin formed from a molded product of a vinyl chloride resin. The vinyl chloride resin molded product forming the surface skin of the automobile interior part such as an automobile instrument panel is required to have various performance.

In recent years, for example, there have been attempts to improve vinyl chloride resin compositions and vinyl chloride resin molded products suitable for use in the production of automobile interior parts such as automobile instrument panels.

Specifically, for example, a proposed technique provides a surface skin for an automobile instrument panel that breaks as designed without fragments being scattered upon inflation and expansion of an air bag, by adding a plasticizer to a vinyl chloride resin composition to improve the tensile elongation of a vinyl chloride resin molded product yielded from the vinyl chloride resin composition. For example, JP 2012-7026 A (PTL 1) reports that, by forming a vinyl chloride resin molded product using a vinyl chloride resin composition for powder molding containing a plasticizer and a hydroxy group-modified silicone oil, the bleeding characteristics (tendency of oozing out to the surface) of the plasticizer and the fluff adhesiveness (adhesiveness of a fiber residue when the surface is wiped with a cloth) can be reduced.

CITATION LIST

Patent Literature

PTL 1: JP 2012-7026 A

SUMMARY

Technical Problem

By forming a vinyl chloride resin molded product using the conventional vinyl chloride resin composition containing the plasticizer and the hydroxy group-modified silicone oil, the stickiness of the molded product surface caused by the bleeding of the plasticizer can be suppressed while ensuring favorable tensile elongation.

However, repeated examination by the inventor has revealed that the conventional vinyl chloride resin composition described in PTL 1 as an example has the following problem: If the molding of a vinyl chloride resin molded product is repeatedly performed using the same mold in the continuous production of molded products, the surface gloss of the resultant vinyl chloride resin molded product increases.

It could therefore be helpful to provide a vinyl chloride resin composition with which an increase in the surface gloss of the resultant vinyl chloride resin molded product can be suppressed even in the case of repeating the molding of a vinyl chloride resin molded product using the same mold, and also favorable tensile elongation and low surface stickiness of the resultant vinyl chloride resin molded product can be ensured. It could also be helpful to provide a vinyl chloride resin molded product without an increase in surface gloss while ensuring favorable tensile elongation and low surface stickiness, and a laminate including the vinyl chloride resin molded product.

Solution to Problem

Through extensive studies to solve the problems stated above, the inventor discovered that, if the blending amount of a plasticizer relative to a vinyl chloride resin is a predetermined proportion or more, sufficient tensile elongation of a molded product can be ensured, but the surface of the molded product tends to become sticky. The inventor also discovered that, even when the blending amount of the plasticizer relative to the vinyl chloride resin is the predetermined proportion or more, if a silicone oil having predetermined property is added in a predetermined proportion or more relative to the plasticizer, an increase in the surface gloss of the resultant vinyl chloride resin molded product can be suppressed even in the case of repeating the molding of a molded product using the same mold, while suppressing stickiness of the surface of the molded product. The present disclosure is based on these discoveries.

To advantageously solve the problems stated above, a presently disclosed vinyl chloride resin composition comprises: (a) a vinyl chloride resin; (b) a plasticizer; and (c) a silicone oil, wherein a content of (b) the plasticizer relative to 100 parts by mass of (a) the vinyl chloride resin is 80 parts by mass or more, a content of (c) the silicone oil relative to 100 parts by mass of (b) the plasticizer is 0.01 parts by mass or more, and a weight reduction rate of (c) the silicone oil at a temperature of 260° C. in thermogravimetric analysis is 7.0 mass % or less. Thus, by setting the blending amount of the plasticizer relative to the vinyl chloride resin to a predetermined proportion or more, sufficient tensile elongation of the molded product can be ensured. Moreover, by blending the silicone oil having a predetermined weight reduction rate or less in a predetermined proportion or more relative to the plasticizer, an increase in the surface gloss of the resultant vinyl chloride resin molded product can be suppressed even in the case of repeating the molding of a molded product using the same mold, while suppressing stickiness of the surface of the molded product even when the blending amount of the plasticizer relative to the vinyl chloride resin is a predetermined proportion or more.

Herein, the "weight reduction rate" can be measured by thermogravimetric analysis (TGA). Specifically, the weight reduction rate can be measured using a thermogravimeter at any temperature, according to the examples described later. In the case of using a mixture of two or more different types of silicone oils, the "weight reduction rate" can be measured as the value of the whole mixture.

Preferably, in the presently disclosed vinyl chloride resin composition, the content of (c) the silicone oil relative to 100 parts by mass of (b) the plasticizer is 1.2 parts by mass or less. As a result of the content of (c) the silicone oil in the vinyl chloride resin composition being not more than the above-mentioned upper limit, an increase in the surface gloss of the vinyl chloride resin molded product when repeating the molding of a molded product can be suppressed sufficiently.

Preferably, in the presently disclosed vinyl chloride resin composition, a kinematic viscosity of (c) the silicone oil is less than $10 \times 10^3$ cSt. As a result of the kinematic viscosity of (c) the silicone oil in the vinyl chloride resin composition being less than the above-mentioned upper limit, the vinyl chloride resin composition has excellent handleability, so that a vinyl chloride resin molded product can be produced more easily.

Herein, the "kinematic viscosity" can be measured in accordance with ASTM D 445-46T using an Ubbelohde viscometer at a temperature of 25° C. In the case of using a mixture of two or more different types of silicone oils, the "kinematic viscosity" can be measured as the value of the whole mixture.

Preferably, in the presently disclosed vinyl chloride resin composition, a kinematic viscosity of (c) the silicone oil is more than 50 cSt. As a result of the kinematic viscosity of (c) the silicone oil in the vinyl chloride resin composition being more than the above-mentioned lower limit, the fluff adhesiveness of a vinyl chloride resin molded product formed using the composition can be reduced.

Preferably, the presently disclosed vinyl chloride resin composition is used in powder molding. The use of the vinyl chloride resin composition for powder molding enables, for example, the vinyl chloride resin composition to be more suited to the formation of a vinyl chloride resin molded product used in an automobile interior part such as an automobile instrument panel.

Preferably, the presently disclosed vinyl chloride resin composition is used in powder slush molding. The use of the vinyl chloride resin composition for powder slush molding enables, for example, the vinyl chloride resin composition to be further suited to the formation of a vinyl chloride resin molded product used in an automobile interior part such as an automobile instrument panel.

To advantageously solve the problems stated above, a presently disclosed vinyl chloride resin molded product is obtainable through molding of the vinyl chloride resin composition described above. By forming the vinyl chloride resin molded product using the vinyl chloride resin composition described above, an increase in surface gloss can be suppressed while ensuring favorable tensile elongation and low surface stickiness.

Preferably, the presently disclosed vinyl chloride resin molded product is used as a surface skin of an automobile instrument panel. The surface skin of the automobile instrument panel formed using the presently disclosed vinyl chloride resin molded product has surface stickiness and gloss reduced favorably, and breaks as designed without fragments being scattered upon expansion of an air bag.

To advantageously solve the problems stated above, a presently disclosed laminate comprises: a foamed polyurethane molded product; and the vinyl chloride resin molded product described above. The laminate formed using the foamed polyurethane molded product and the vinyl chloride resin molded product can be favorably used in an automobile interior part such as an automobile instrument panel.

Advantageous Effect

It is therefore possible to provide a vinyl chloride resin composition with which an increase in the surface gloss of the resultant vinyl chloride resin molded product can be suppressed even in the case of repeating the molding of a vinyl chloride resin molded product using the same mold, and also favorable tensile elongation and low surface stickiness of the resultant vinyl chloride resin molded product can be ensured.

It is also possible to provide a vinyl chloride resin molded product without an increase in surface gloss while ensuring favorable tensile elongation and low surface stickiness, and a laminate including the vinyl chloride resin molded product.

DETAILED DESCRIPTION

One of the disclosed embodiments is described in detail below.

A presently disclosed vinyl chloride resin composition can be used, for example, in the formation of a presently disclosed vinyl chloride resin molded product. The vinyl chloride resin molded product formed using the presently disclosed vinyl chloride resin composition can be used, for example, in the production of a presently disclosed laminate including the vinyl chloride resin molded product. The presently disclosed vinyl chloride resin molded product is suitable for use as an automobile interior material, e.g. a surface skin of an automobile interior part such as an automobile instrument panel.

(Vinyl Chloride Resin Composition)

The presently disclosed vinyl chloride resin composition comprises: (a) a vinyl chloride resin; (b) a plasticizer; and (c) a silicone oil having a predetermined weight reduction rate or less, wherein the content of (b) the plasticizer relative to the content of (a) the vinyl chloride resin is a predetermined content or more, and the content of (c) the silicone oil relative to the content of (b) the plasticizer is a predetermined content or more. The presently disclosed vinyl chloride resin composition may optionally further contain additives and the like, in addition to these components. Since the presently disclosed vinyl chloride resin composition contains the above-mentioned predetermined components in predetermined amounts, an increase in the surface gloss of the resultant vinyl chloride resin molded product can be suppressed even in the case of repeating the molding of a vinyl chloride resin molded product using the same mold, and also favorable tensile elongation and low surface stickiness of the resultant vinyl chloride resin molded product can be sufficiently ensured. Consequently, for example, a surface skin of an automobile instrument panel using the vinyl chloride resin molded product has surface stickiness and gloss reduced favorably, and breaks as designed without fragments being scattered upon expansion of an air bag.

<(a) Vinyl Chloride Resin>

(a) The vinyl chloride resin used in the vinyl chloride resin composition may, for example, contain one or more types of vinyl chloride resin particles, and optionally further contain one or more types of vinyl chloride resin fine particles. In particular, (a) the vinyl chloride resin preferably contains at least vinyl chloride resin particles, more preferably contains vinyl chloride resin particles and vinyl chloride resin fine particles, and further preferably contains one type of vinyl chloride resin particles and two types of vinyl chloride resin fine particles.

Herein, the term "resin particles" is used to refer to particles having a particle diameter of at least 30 μm and the term "resin fine particles" is used to refer to particles having a particle diameter of less than 30 μm.

Conventionally known production methods such as suspension polymerization, emulsion polymerization, solution polymerization, and bulk polymerization can be used to produce (a) the vinyl chloride resin.

«Composition»

Examples of (a) the vinyl chloride resin include homopolymers composed of vinyl chloride monomer units, and vinyl chloride-based copolymers preferably containing 50 mass % or more of vinyl chloride monomer units and more preferably 70 mass % or more of vinyl chloride monomer units. Specific examples of monomers (comonomers) copolymerizable with vinyl chloride monomers that can form vinyl chloride copolymers include: olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxy propyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyltrimethylammonium chloride; and allyl amines and derivatives thereof such as allylamine benzoate and diallyldimethylammonium chloride. The above examples of monomers are merely some of comonomers. Further examples of various types of monomers that can be used as comonomers are provided in pages 75-104 of "Polyvinyl chloride" edited by the Vinyl Section of the Kinki Chemical Society Japan and published by Nikkan Kogyo Shimbun, Ltd. (1988). Any one of these comonomers or any two or more of these comonomers may be used. Moreover, (a) the vinyl chloride resin may include a resin formed by graft polymerization of (1) vinyl chloride or (2) vinyl chloride and a comonomer such as described above, with a resin such as an ethylene-vinyl acetate copolymer, an ethylene-methyl methacrylate copolymer, an ethylene-ethyl acrylate copolymer, or a chlorinated polyethylene.

The present description uses the term "(meth)acryl" to refer to either or both of acryl and methacryl.

«Vinyl Chloride Resin Particles»

In the vinyl chloride resin composition, the vinyl chloride resin particles typically function as a matrix resin (substrate). The vinyl chloride resin particles are preferably produced by suspension polymerization.

[Average Degree of Polymerization]

The average degree of polymerization of the vinyl chloride resin particles is preferably 500 or more, more preferably 700 or more, and further preferably 900 or more, and preferably 5000 or less, more preferably 3000 or less, further preferably 2500 or less, and still more preferably 1500 or less. As a result of the average degree of polymerization of the vinyl chloride resin particles being not less than the above-mentioned lower limit, more favorable tensile elongation can be achieved while sufficiently ensuring the physical strength of a vinyl chloride resin molded product formed using the vinyl chloride resin composition. As a result of the average degree of polymerization of the vinyl chloride resin particles being not more than the above-mentioned upper limit, the meltability of the vinyl chloride resin molded product can be improved to improve surface smoothness.

Herein, the "average degree of polymerization" can be measured in accordance with JIS K6720-2.

[Average Particle Diameter]

The average particle diameter of the vinyl chloride resin particles is typically 30 μm or more, preferably 50 μm or more, and more preferably 100 μm or more, and preferably 500 μm or less and more preferably 200 μm or less. As a result of the average particle diameter of the vinyl chloride resin particles being not less than the above-mentioned lower limit, the powder fluidity of the vinyl chloride resin composition can be further improved. As a result of the average particle diameter of the vinyl chloride resin particles being not more than the above-mentioned upper limit, the meltability of the vinyl chloride resin composition can be further improved, and the smoothness of the vinyl chloride resin molded product formed using the composition can be further improved.

Herein, the "average particle diameter" can be measured as a volume-average particle diameter in accordance with JIS Z8825 by a laser diffraction method.

[Percentage Content]

The percentage content of the vinyl chloride resin particles in (a) the vinyl chloride resin relative to 100 mass % of (a) the vinyl chloride resin is preferably 70 mass % or more and more preferably 80 mass % or more, may be 100 mass %, and is preferably 99 mass % or less and more preferably 95 mass % or less. As a result of the percentage content of the vinyl chloride resin particles in (a) the vinyl chloride resin being not less than the above-mentioned lower limit, more favorable tensile elongation can be achieved while sufficiently ensuring the physical strength of a vinyl chloride resin molded product formed using the vinyl chloride resin composition. As a result of the percentage content of the vinyl chloride resin particles in (a) the vinyl chloride resin being not more than the above-mentioned upper limit, the powder fluidity of the vinyl chloride resin composition can be further improved.

«Vinyl Chloride Resin Fine Particles»

In the vinyl chloride resin composition, the vinyl chloride resin fine particles typically function as a dusting agent (powder fluidity modifier). The vinyl chloride resin fine particles are preferably produced by emulsion polymerization.

[Average Degree of Polymerization]

The average degree of polymerization of the vinyl chloride resin fine particles is preferably 500 or more and more preferably 700 or more, and preferably 5000 or less, more preferably 3000 or less, and further preferably 2500 or less. For example, in the case of using two types of vinyl chloride resin fine particles having different average degrees of polymerization as dusting agents, appropriate selection may be made, e.g. the average degree of polymerization of one type of vinyl chloride resin fine particles being 500 or more and 1000 or less and the average degree of polymerization of the other type of vinyl chloride resin fine particles being 1400 or more and 2200 or less. As a result of the average degree of polymerization of the vinyl chloride resin fine particles as a dusting agent being not less than the above-mentioned lower limit, the vinyl chloride resin composition has more favorable powder fluidity, and a molded product obtained using the composition has more favorable tensile elongation. As a result of the average degree of polymerization of the vinyl chloride resin fine particles being not more than the above-mentioned upper limit, the meltability of the vinyl chloride resin composition can be further improved, and the surface smoothness of a vinyl chloride resin molded product formed using the composition can be further improved.

[Average Particle Diameter]

The average particle diameter of the vinyl chloride resin fine particles is typically less than 30 μm, preferably 10 μm or less, and preferably 0.1 μm or more. As a result of the average particle diameter of the vinyl chloride resin fine particles being not less than the above-mentioned lower limit, more favorable powder fluidity of the vinyl chloride resin composition can be achieved, for example, without excessively reducing the size as a dusting agent. As a result of the average particle diameter of the vinyl chloride resin fine particles being not more than the above-mentioned upper limit, the meltability of the vinyl chloride resin composition can be further enhanced, and the smoothness of the formed vinyl chloride resin molded product can be further improved.

[Percentage Content]

The percentage content of the vinyl chloride resin fine particles in (a) the vinyl chloride resin relative to 100 mass % of (a) the vinyl chloride resin is preferably 1 mass % or more and more preferably 5 mass % or more, and preferably 30 mass % or less and more preferably 20 mass % or less, and may be 0 mass %. As a result of the percentage content of the vinyl chloride resin fine particles in (a) the vinyl chloride resin being not less than the above-mentioned lower limit, the powder fluidity of the vinyl chloride resin composition can be further improved. As a result of the percentage content of the vinyl chloride resin fine particles in (a) the vinyl chloride resin being not more than the above-mentioned upper limit, the physical strength of the vinyl chloride resin molded product formed using the vinyl chloride resin composition can be further enhanced.

<(b) Plasticizer>

The presently disclosed vinyl chloride resin composition further contains (b) the plasticizer in a predetermined amount relative to the content of (a) the vinyl chloride resin.

«Content»

The content of (b) the plasticizer relative to 100 parts by mass of (a) the vinyl chloride resin needs to be 80 parts by mass or more. The content of (b) the plasticizer relative to 100 parts by mass of (a) the vinyl chloride resin is preferably 85 parts by mass or more, and preferably 200 parts by mass or less, more preferably 100 parts by mass or less, and further preferably 90 parts by mass or less. If the content of (b) the plasticizer is less than the above-mentioned lower limit, favorable tensile elongation of the vinyl chloride resin molded product formed using the vinyl chloride resin composition cannot be ensured. In the case where the content of (b) the plasticizer is not less than the above-mentioned lower limit, typically a problem of stickiness of the molded product surface arises. The presently disclosed vinyl chloride resin composition, however, contains the below-mentioned predetermined (c) silicone oil in a predetermined amount or more relative to the content of (b) the plasticizer, so that the stickiness of the molded product surface can be suppressed sufficiently. If the content of (b) the plasticizer is not more than the above-mentioned upper limit, the stickiness of the vinyl chloride resin molded product surface can be further suppressed.

«Type»

Specific examples of (b) the plasticizer include primary plasticizers and secondary plasticizers listed below.

Examples of so-called primary plasticizers include:

linear trimellitates having linear ester-forming alkyl groups, such as trimethyl trimellitate, triethyl trimellitate, tri-n-propyl trimellitate, tri-n-butyl trimellitate, tri-n-pentyl trimellitate, tri-n-hexyl trimellitate, tri-n-heptyl trimellitate, tri-n-octyl trimellitate, tri-n-nonyl trimellitate, tri-n-decyl trimellitate, tri-n-undecyl trimellitate, tri-n-dodecyl trimellitate, tri-n-tridecyl trimellitate, tri-n-tetradecyl trimellitate, tri-n-pentadecyl trimellitate, tri-n-hexadecyl trimellitate, tri-n-heptadecyl trimellitate, tri-n-stearyl trimellitate, and tri-n-alkyl trimellitate (the carbon numbers of alkyl groups included in tri-n-alkyl trimellitate may be different from each other in one molecule) [there trimellitates may each be a single compound or a mixture];

branched trimellitates having branched ester-forming alkyl groups, such as tri-i-propyl trimellitate, tri-i-butyl trimellitate, tri-i-pentyl trimellitate, tri-i-hexyl trimellitate, tri-i-heptyl trimellitate, tri-i-octyl trimellitate, tri(2-ethylhexyl) trimellitate, tri-i-nonyl trimellitate, tri-i-decyl trimellitate, tri-i-undecyl trimellitate, tri-i-dodecyl trimellitate, tri-i-tridecyl trimellitate, tri-i-tetradecyl trimellitate, tri-i-pentadecyl trimellitate, tri-i-hexadecyl trimellitate, tri-i-heptadecyl trimellitate, tri-i-octadecyl trimellitate, and trialkyl trimellitate (the carbon numbers of alkyl groups included in trialkyl trimellitate may be different from each other in one molecule) [there trimellitates may each be a single compound or a mixture];

linear pyromellitates having linear ester-forming alkyl groups, such as tetramethyl pyromellitate, tetraethyl pyromellitate, tetra-n-propyl pyromellitate, tetra-n-butyl pyromellitate, tetra-n-pentyl pyromellitate, tetra-n-hexyl pyromellitate, tetra-n-heptyl pyromellitate, tetra-n-octyl pyromellitate, tetra-n-nonyl pyromellitate, tetra-n-decyl pyromellitate, tetra-n-undecyl pyromellitate, tetra-n-dodecyl pyromellitate, tetra-n-tridecyl pyromellitate, tetra-n-tetradecyl pyromellitate, tetra-n-pentadecyl pyromellitate, tetra-n-hexadecyl pyromellitate, tetra-n-heptadecyl pyromellitate, tetra-n-stearyl pyromellitate, and tetra-n-alkyl pyromellitate (the carbon numbers of alkyl groups included in tetra-n-alkyl pyromellitate may be different from each other in one molecule) [there pyromellitates may each be a single compound or a mixture];

branched pyromellitates having branched ester-forming alkyl groups, such as tetra-i-propyl pyromellitate, tetra-i-butyl pyromellitate, tetra-i-pentyl pyromellitate, tetra-i-hexyl pyromellitate, tetra-i-heptyl pyromellitate, tetra-i-octyl pyromellitate, tetra(2-ethylhexyl) pyromellitate, tetra-i-nonyl pyromellitate, tetra-i-decyl pyromellitate, tetra-i-undecyl pyromellitate, tetra-i-dodecyl pyromellitate, tetra-i-tridecyl pyromellitate, tetra-i-tetradecyl pyromellitate, tetra-i-pentadecyl pyromellitate, tetra-i-hexadecyl pyromellitate, tetra-i-heptadecyl pyromellitate, tetra-i-octadecyl pyromellitate, and tetraalkyl pyromellitate (the carbon numbers of alkyl groups included in tetraalkyl pyromellitate may be different from each other in one molecule) [there pyromellitates may each be a single compound or a mixture];

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as triethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methyl acetyl ricinoleate, butyl acetyl ricinoleate, glyceryl monoricinoleate, and diethylene glycol monoricinoleate;

stearic acid derivatives such as n-butyl stearate and diethylene glycol distearate (except 12-hydroxystearic acid ester);

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris(chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; butyl epoxy stearate; phenyl oleate; and methyl dihydroabietate.

These plasticizers may be used alone or in combination of two or more thereof such as a primary plasticizer and a secondary plasticizer. In a situation in which a secondary plasticizer is used, a primary plasticizer of equivalent or greater mass is preferably used in combination with the secondary plasticizer.

Of these plasticizers, trimellitates and/or pyromellitates are preferable, trimellitates are more preferable, linear trimellitates are further preferable, and linear trimellitates having two or more alkyl groups different in carbon number in a molecule are still more preferable, in terms of obtaining favorable tensile elongation. The carbon numbers of the alkyl groups are preferably 8 to 10, and the alkyl groups are more preferably n-octyl or n-decyl. It is also preferable to use epoxidized soybean oil together with the above-mentioned trimellitate.

Although the form of (b) the plasticizer is not limited, the plasticizer is preferably liquid at normal temperature and normal pressure, in terms of easiness of mixture with (a) the vinyl chloride resin and also in terms of suppressing blooming on the surface of the formed vinyl chloride resin molded product (a phenomenon that ingredients precipitate on the molded product surface and turn the surface white).

Herein, the "normal temperature" refers to 23° C., and the "normal pressure" refers to 1 atm (absolute pressure).

<(c) Silicone Oil>

The presently disclosed vinyl chloride resin composition further contains (c) the silicone oil having a predetermined weight reduction rate of 7.0 mass % or less in a predetermined amount or more relative to the content of (b) the plasticizer, in addition to (a) the vinyl chloride resin and (b) the plasticizer.

«Type»

(c) The silicone oil whose weight reduction rate is the above-mentioned predetermined weight reduction rate or less is not limited, and may be unmodified silicone oil, modified silicone oil, or a mixture thereof. Examples of the unmodified silicone oil include polymers having a polysiloxane structure such as polydimethylsiloxane, polydiethylsiloxane, and poly(methyl ethyl) siloxane, and mixtures thereof, without being limited thereto. As the unmodified silicone oil, polydimethylsiloxane is particularly preferable.

Examples of the modified silicone oil include: polar group-modified silicone oils in which a polar group, such as a carboxyl group, a mercapto group, an amino group, an epoxy group, a (meth)acryloyloxy group, or a fatty acid amide group has been introduced into a polymer having a polysiloxane structure; and nonpolar group-modified silicone oils in which a nonpolar group has been introduced into a polymer having a polysiloxane structure. As the modified silicone oil, polar group-modified silicone oil is preferable, fatty acid amide group-modified silicone oil is more preferable, and higher fatty acid amide group-modified silicone oil with the carbon number of the chain hydrocarbon of the fatty acid amide group being 12 or more is further preferable.

The moiety at which the polar group or nonpolar group is introduced may be an end (one end or both ends) and/or side chain of the polymer having a polysiloxane structure.

The present description uses the term "(meth)acryloyloxy" to refer to either or both of acryloyloxy and methacryloyloxy.

«Content»

The content of (c) the silicone oil relative to 100 parts by mass of (b) the plasticizer needs to be 0.01 parts by mass or more. In the case of unmodified silicone oil, the content of (c) the silicone oil relative to 100 parts by mass of (b) the plasticizer is preferably 0.1 parts by mass or more, more preferably 0.4 parts by mass or more, further preferably 0.5 parts by mass or more, and preferably 5 parts by mass or less, more preferably 3 parts by mass or less, further preferably 1.5 parts by mass or less, still more preferably 0.9 parts by mass or less, and particularly preferably 0.7 parts by mass or less. In the case of modified silicone oil, the content of (c) the silicone oil relative to 100 parts by mass of (b) the plasticizer is preferably 0.1 parts by mass or more and more preferably 0.15 parts by mass or more, and preferably 3 parts by mass or less, more preferably 1 parts by mass or less, and further preferably 0.5 parts by mass or less. When adding the predetermined silicone oil, if the content of (c) the silicone oil is less than the above-mentioned lower limit, the stickiness of the surface of the molded product cannot be reduced sufficiently in the case where the content of (b) the plasticizer relative to (a) the vinyl chloride resin is set to a predetermined amount or more to ensure favorable tensile elongation of the molded product. If the content of (c) the silicone oil is not more than the above-mentioned upper limit, an increase in the gloss of the molded product surface can be further suppressed even in the case of continuously forming vinyl chloride resin molded products using the vinyl chloride resin composition.

In the case of unmodified silicone oil, the content of (c) the silicone oil relative to 100 parts by mass of (a) the vinyl chloride resin is preferably 0.01 parts by mass or more, more preferably 0.1 parts by mass or more, and further preferably 0.4 parts by mass or more, and preferably 5 parts by mass or less, more preferably 3 parts by mass or less, further preferably 1.5 parts by mass or less, and still more preferably 0.8 parts by mass or less. In the case of modified silicone oil, the content of (c) the silicone oil relative to 100 parts by mass of (a) the vinyl chloride resin is preferably 0.1 parts by mass or more and more preferably 0.15 parts by mass or more, and preferably 3 parts by mass or less, more preferably 1 parts by mass or less, and further preferably 0.4 parts by mass or less. If the content of (c) the silicone oil is not less than the above-mentioned lower limit, the stickiness of the vinyl chloride resin molded product surface caused by the plasticizer can be reduced sufficiently. If the content of (c) the silicone oil is not more than the above-mentioned upper limit, an increase in the gloss of the molded product surface can be further suppressed even in the case of continuously forming vinyl chloride resin molded products using the vinyl chloride resin composition.

«Weight Reduction Rate»

The weight reduction rate of (c) the silicone oil at a temperature of 260° C. in thermogravimetric analysis needs to be 7.0 mass % or less. In the case of unmodified silicone oil, the weight reduction rate of (c) the silicone oil is preferably 6.0 mass % or less, more preferably 4.0 mass % or less, further preferably 1.0 mass % or less, and still more preferably 0.4 mass % or less. The weight reduction rate of (c) the silicone oil may be 0 mass % (i.e. no weight reduction of the silicone oil at a temperature of 260° C.), but is preferably more than 0.1 mass %. In the case of modified silicone oil, the weight reduction rate of (c) the silicone oil is preferably 6.0 mass % or less. If the weight reduction rate of (c) the silicone oil is more than the above-mentioned upper limit, an increase in the surface gloss of the molded product cannot be suppressed sufficiently in the case of continuously forming vinyl chloride resin molded products using the vinyl chloride resin composition.

Herein, the "weight reduction rate" can be, for example, controlled based on whether or not silicone oil is modified and the mixing ratio of two or more types of silicone oils.

In the case of unmodified silicone oil, the weight reduction rate of (c) the silicone oil at a temperature of 200° C. in thermogravimetric analysis is preferably 3.0 mass % or less, more preferably 2.0 mass % or less, further preferably 1.0 mass % or less, and particularly preferably 0.4 mass % or less, and may be 0 mass %. In the case of modified silicone oil, the weight reduction rate of (c) the silicone oil at a temperature of 200° C. in thermogravimetric analysis is preferably 3.0 mass % or less, and more preferably 2.0 mass % or less.

In the case of unmodified silicone oil, the weight reduction rate of (c) the silicone oil at a temperature of 300° C. in thermogravimetric analysis is preferably 11.0 mass % or less, more preferably 8.5 mass % or less, further preferably 5 mass % or less, still more preferably 1 mass % or less, and particularly preferably 0.7 mass % or less, and may be 0 mass %. In the case of modified silicone oil, the weight reduction rate of (c) the silicone oil at a temperature of 300° C. in thermogravimetric analysis is preferably 10.0 mass % or less.

If the weight reduction rate of (c) the silicone oil is not more than the above-mentioned upper limit, an increase in the surface gloss of the molded product can be suppressed more sufficiently even in the case of continuously forming vinyl chloride resin molded products using the vinyl chloride resin composition.

Although the reason that the surface glossiness of the vinyl chloride resin molded product can be favorably suppressed as a result of the weight reduction rate of (c) the silicone oil at high temperature being not more than the above-mentioned upper limit is not clear, the reason is presumed to be as follows.

Silicone oil may pyrolyze and decrease in weight, at high temperature. For example, when forming a vinyl chloride resin molded product using a vinyl chloride resin composition, typically a mold used for the formation of a molded product is heated to a high temperature of 180° C. to 300° C., and the vinyl chloride resin composition is brought into contact with the heated mold and molten, to obtain a molded product having a desired shape. In this operation, if silicone oil in the vinyl chloride resin composition in contact with the high-temperature mold pyrolyzes, the pyrolyzed silicone oil component adheres to and remains on the mold surface even after the mold is cooled and the molded product is removed from the mold. Typically, vinyl chloride resin molded products are continuously formed by repeatedly heating and cooling the mold. As the number of repetitions of molded product formation increases, a residue of pyrolyzed silicone oil adheres to the mold surface, which promotes metallic contamination of the mold surface. Such metallic contamination tends to be transferred to the surface of a molded product formed subsequently. The surface of a molded product to which such metallic contamination has been transferred has a higher gloss caused by the pyrolyzed silicone oil, than the surface of a molded product to which metallic contamination has not been transferred. The continuous formability of molded products thus decreases.

On the other hand, the silicone oil used in the production of the presently disclosed vinyl chloride resin composition has not more than a predetermined weight reduction rate at high temperature, and so resists pyrolysis even at high temperature. Therefore, the mold is kept from metallic contamination caused by pyrolyzed silicone oil in the formation of vinyl chloride resin molded products. Even in the case of continuously forming molded products, low surface glossiness can be maintained in the obtained vinyl chloride resin molded products.

«Kinematic Viscosity»

In the case of unmodified silicone oil, the kinematic viscosity of (c) the silicone oil is preferably less than $10 \times 10^3$ cSt and more preferably $7 \times 10^3$ cSt or less, and preferably more than 50 cSt, more preferably 70 cSt or more, further preferably $1 \times 10^3$ cSt or more, and still more preferably $3 \times 10^3$ cSt or more. If the kinematic viscosity of (c) the silicone oil is more than the above-mentioned lower limit, the fluff adhesiveness of the surface of a vinyl chloride resin molded product obtained using the vinyl chloride resin composition can be reduced more favorably. If the kinematic viscosity of (c) the silicone oil is less than the above-mentioned upper limit, the silicone oil has excellent handleability, so that a vinyl chloride resin molded product can be produced more easily.

In the case where (c) the silicone oil is modified silicone oil, the modified silicone oil may be, for example, a waxy solid at a temperature of 25° C. and normal pressure, without being limited thereto.

<Additives>

The presently disclosed vinyl chloride resin composition may further contain various additives, besides the components described above. Although no specific limitations are placed on these additives, examples of additives that may be used include: stabilizers such as perchloric acid-treated hydrotalcite, zeolites, β-diketones, and fatty acid metal salts; mold release agents; dusting agents other than the vinyl chloride resin fine particles; and other additives.

«Perchloric Acid-Treated Hydrotalcite»

The perchloric acid-treated hydrotalcite that may be included in the vinyl chloride resin composition can be, as perchloric acid-introduced hydrotalcite, easily produced by, for example, addition and stirring of hydrotalcite with a dilute aqueous solution of perchloric acid, followed by filtration, dehydration, and drying as required. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of 0.1 mol or more and 2 mol or less of perchloric acid relative to 1 mol of hydrotalcite is preferable.

The substitution ratio of carbonate anions in the untreated (unsubstituted with no introduction of perchlorate anions) hydrotalcite by perchlorate anions is preferably 50 mol % or more, more preferably 70 mol % or more, and particularly preferably 85 mol % or more. Moreover, the substitution ratio of carbonate anions in the untreated (unsubstituted with no introduction of perchlorate anions) hydrotalcite by perchlorate anions is preferably 95 mol % or less. As a result of the substitution ratio of carbonate anions in the untreated (unsubstituted with no introduction of perchlorate anions) hydrotalcite by perchlorate anions being in the range described above, a vinyl chloride resin molded product can be produced more easily.

Hydrotalcite is a non-stoichiometric compound represented by a general formula: $[Mg_{1-x}Al_x(OH)_2]^{x+}[(CO_3)_{x/2}.mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}.mH_2O]^{x-}$. In the general formula shown above, x represents a number that is greater than 0 and no greater than 0.33. Natural hydrotalcite is represented by $Mg_6Al_2(OH)_{16}CO_3.4H_2O$. On the other hand, a synthetic hydrotalcite represented by $Mg_{4.5}Al_2(OH)_{13}CO_3.3.5H_2O$ is commercially available. Synthetic hydrotalcite can for example be synthesized by a method described in JP S61-174270 A.

The amount of the perchloric acid-treated hydrotalcite is not limited. The amount of the perchloric acid-treated hydrotalcite relative to 100 parts by mass of (a) the vinyl chloride resin is preferably 0.5 parts by mass or more and more preferably 1 parts by mass or more, and preferably 7 parts by mass or less and more preferably 6 parts by mass or less. As a result of the amount of the perchloric acid-treated hydrotalcite being in the range described above, the tensile elongation of a vinyl chloride resin molded product formed through molding of the vinyl chloride resin composition can be maintained more favorably.

«Zeolite»

The vinyl chloride resin composition may include a zeolite as a stabilizer. A zeolite is a compound represented by a general formula: $M_{x/n}.[(AlO_2)_x.(SiO_2)_y].zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The amount of the zeolite is not limited. The amount of the zeolite relative to 100 parts by mass of (a) the vinyl chloride resin is preferably 0.1 parts by mass or more, and preferably 5 parts by mass or less.

«β-Diketone»

A β-diketone can be used to effectively suppress variation in initial color of a vinyl chloride resin molded product obtained through powder molding of the vinyl chloride resin composition. Specific examples of β-diketones include dibenzoylmethane, stearoylbenzoylmethane, and palmitoylbenzoylmethane. Any one of these β-diketones may be used alone or a combination of any two or more of these β-diketones may be used.

The amount of the β-diketone is not limited. The amount of the β-diketone relative to 100 parts by mass of (a) the vinyl chloride resin is preferably 0.01 parts by mass or more, and preferably 5 parts by mass or less.

«Fatty Acid Metal Salt»

The vinyl chloride resin composition may contain a fatty acid metal salt. The fatty acid metal salt is not limited, and may be any fatty acid metal salt. The fatty acid metal salt is preferably a metal salt of a monobasic fatty acid, more preferably a metal salt of a monobasic fatty acid having a carbon number of 12 to 24, and even more preferably a metal salt of a monobasic fatty acid having a carbon number of 15 to 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, even more preferably a metal from periods 3 to 6 of the periodic table that can produce divalent cations, and particularly preferably a metal from period 4 of the periodic table that can produce divalent cations. The fatty acid metal salt is most preferably zinc stearate.

The amount of the fatty acid metal salt is not limited. The amount of the fatty acid metal salt relative to 100 parts by mass of (a) the vinyl chloride resin is preferably 0.01 parts by mass or more and more preferably 0.03 parts by mass or more, and preferably 5 parts by mass or less, more preferably 1 parts by mass or less, and further preferably 0.5 parts by mass or less. As a result of the amount of the fatty acid metal salt being in the range described above, the color difference value of a vinyl chloride resin molded product formed through molding of the vinyl chloride resin composition can be reduced.

«Mold Release Agent»

The mold release agent is not limited, and examples include 12-hydroxystearic acid-based lubricants such as a 12-hydroxystearic acid ester and a 12-hydroxystearic acid oligomer. The content of the mold release agent is not limited, and may be 0.01 parts by mass or more and 5 parts by mass or less relative to 100 parts by mass of (a) the vinyl chloride resin.

«Other Dusting Agents»

Examples of other dusting agents besides the vinyl chloride resin fine particles that may be included in the vinyl chloride resin composition include: inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of 10 nm or more and 100 nm or less are preferable.

The amount of the other dusting agents is not limited. The amount of the other dusting agents relative to 100 parts by mass of (a) the vinyl chloride resin is preferably 30 parts by mass or less and more preferably 25 parts by mass or less, and may be 10 parts by mass or more. One of these other dusting agents may be used individually, or two or more of these other dusting agents may be used in combination. The other dusting agents may be used together with the aforementioned vinyl chloride resin fine particles.

«Other Additives»

Other additives that may be contained in the vinyl chloride resin composition are not limited. Examples include colorants (pigments), impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, and foaming agents.

Specific examples of colorants (pigments) include quinacridone pigments, perylene pigments, condensed polyazo pigments, isoindolinone pigments, copper phthalocyanine pigments, titanium white, and carbon black. Any one of these pigments or any two or more of these pigments may be used.

A quinacridone pigment is obtained through concentrated sulfuric acid treatment of a p-phenylene dianthranilic acid and has a hue from yellowish red to reddish purple. Specific examples of quinacridone pigments include quinacridone red, quinacridone magenta, and quinacridone violet.

A perylene pigment is obtained through a condensation reaction of perylene-3,4,9,10-tetracarboxylic anhydride and an aromatic primary amine and has a hue from red to red-purple/brown. Specific examples of perylene pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone pigment is obtained through a condensation reaction of 4,5,6,7-tetrachloroisoindolinone and an aromatic primary diamine and has a hue from greenish yellow to red/brown. A specific example of an isoindolinone pigment is isoindolinone yellow.

A copper phthalocyanine pigment is a pigment in which copper is coordinated with a phthalocyanine and has a hue from yellowish green to bright blue. Specific examples of copper phthalocyanine pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the vinyl chloride resin composition. Note that the impact modifier is dispersed as a heterogeneous phase of fine elastic particles in the vinyl chloride resin composition. In the vinyl chloride resin composition, polar groups and chains graft polymerized with the elastic particles are compatible with (a) the vinyl chloride resin and improve impact resistance of the vinyl chloride resin molded product obtained using the vinyl chloride resin composition.

Specific examples of antioxidants include phenolic antioxidants, sulfuric antioxidants, and phosphoric antioxidants such as phosphite.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazoles, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); and gaseous foaming agents such as chlorofluorocarbons, carbon dioxide gas, water, and volatile hydrocarbon compounds (for example, pentane), and microcapsules containing any of these gaseous foaming agents.

<Production Method of Vinyl Chloride Resin Composition>

The presently disclosed vinyl chloride resin composition can be produced by mixing the components described above.

No specific limitations are placed on the method used to mix (a) the vinyl chloride resin, (b) the plasticizer, (c) the silicone oil, and additives used as required. One example of the mixing method involves mixing the components with the exception of the dusting agent including the vinyl chloride resin fine particles by dry blending and subsequently adding and mixing in the dusting agent. The dry blending is preferably carried out using a Henschel mixer. The temperature during dry blending is not limited, and is preferably 50° C. or more and more preferably 70° C. or more, and preferably 200° C. or less.

<Use of Vinyl Chloride Resin Composition>

The obtained vinyl chloride resin composition can be suitably used in powder molding, and more suitably used in powder slush molding.

(Vinyl Chloride Resin Molded Product)

A presently disclosed vinyl chloride resin molded product is obtained through molding of the vinyl chloride resin composition described above by any method. Since the presently disclosed vinyl chloride resin molded product is formed using the presently disclosed vinyl chloride resin composition, an increase in surface gloss can be suppressed while ensuring favorable tensile elongation and low surface stickiness. The presently disclosed vinyl chloride resin molded product is therefore suitable for use as an automobile interior material, e.g. a surface skin of an automobile interior part such as an automobile instrument panel or a door trim, and particularly suitable for use as a surface skin of an automobile instrument panel.

«Method of Molding Vinyl Chloride Resin Molded Product»

The mold temperature during powder slush molding is not limited, and is preferably 200° C. or more and more preferably 220° C. or more, and preferably 300° C. or less and more preferably 280° C. or less.

In production of the vinyl chloride resin molded product, for example, the following method may be used without being limited thereto: The presently disclosed vinyl chloride resin composition is sprinkled onto a mold having a temperature in the aforementioned range. The vinyl chloride resin composition is initially left for 5 seconds or more and 30 seconds or less and, after shaking off any excess vinyl chloride resin composition, is then further left for 30 seconds or more and 3 minutes or less at a given temperature. The mold is subsequently cooled to 10° C. or more and 60° C. or less, and the presently disclosed vinyl chloride resin molded product obtained thereby is removed from the mold. The removed vinyl chloride resin molded product is, for example, yielded as a sheet-like molded product having the shape of the mold.

As the method of molding the vinyl chloride resin molded product, for example, a vinyl chloride resin molded product may be formed only once (one shot) or continuously formed a plurality of times according to the above-mentioned method. In the case of continuously forming a vinyl chloride resin molded product, the vinyl chloride resin molded product can be formed a plurality of times using the same mold, without cleaning the mold.

(Laminate)

A presently disclosed laminate comprises a foamed polyurethane molded product and the vinyl chloride resin molded product described above. Since the presently disclosed laminate includes the vinyl chloride resin molded product formed using the presently disclosed vinyl chloride resin composition, an increase in surface gloss can be suppressed while ensuring favorable tensile elongation and low surface stickiness. The presently disclosed laminate is therefore suitable for use as an automobile interior material for an automobile interior part such as an automobile instrument panel or a door trim, and particularly suitable for use as an automobile instrument panel.

The stacking method is not limited. Examples of stacking methods that can be adopted include: (1) a method in which the foamed polyurethane molded product and the vinyl chloride resin molded product are prepared separately and are subsequently joined together by, for example, thermal fusion bonding, thermal adhesion, or using a commonly known adhesive; and (2) a method in which raw materials of the foamed polyurethane molded product such as an isocyanate and a polyol are caused to react on the vinyl chloride resin molded product so as to polymerize while carrying out polyurethane foaming by a commonly known method to directly form the foamed polyurethane molded product on the vinyl chloride resin molded product. The latter method (2) is more suitable because it involves a simple process and enables laminates of various different shapes to be obtained while facilitating firm adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the weight reduction rate and kinematic viscosity of silicone oil, the average degrees of polymerization and average particle diameters of vinyl chloride resin particles and vinyl chloride resin fine particles, the initial and after-heating (heat aging test) tensile elongations of a vinyl chloride resin molded product at normal temperature, the surface stickiness (coefficient of dynamic friction) and fluff adhesiveness of the vinyl chloride resin molded product, and the change in surface glossiness when continuously forming the vinyl chloride resin molded product.

<Weight Reduction Rate>

The weight reduction rate of the silicone oil was measured using a thermogravimeter (product name "STA7200" produced by Hitachi High-Tech Science Corporation). Specifically, the mass of the silicone oil at each measurement temperature was measured under the conditions of heating rate: 10° C./minute and measurement temperature range: 50° C. to 400° C., in a measurement environment of an air atmosphere. Using the measured mass G50 (g) of the silicone oil at a temperature of 50° C. and mass G260 (g) of the silicone oil at a temperature of 260° C., the weight reduction rate (mass %)=100×(G50−G260)/G50 of the silicone oil when increased in temperature from 50° C. to 260° C. was calculated.

<Kinematic Viscosity>

The kinematic viscosity $\eta^{CS/25}$ (unit: mm$^2$/s=cSt (also referred to as "cs")) of the silicone oil at a temperature of 25° C. was measured in accordance with ASTM D 445-46T using an Ubbelohde viscometer.

<Average Degree of Polymerization>

The average degree of polymerization of each of the vinyl chloride resin particles and the vinyl chloride resin fine particles were calculated by measuring the viscosity of a solution of the vinyl chloride resin particles or vinyl chloride resin fine particles dissolved in cyclohexanone in accordance with JIS K6720-2.

<Average Particle Diameter>

The average particle diameter (volume-average particle diameter (μm)) of each of the vinyl chloride resin particles and the vinyl chloride resin fine particles was measured in accordance with JIS Z8825. Specifically, the average particle diameter of each of the vinyl chloride resin particles and the vinyl chloride resin fine particles was calculated by dispersing the vinyl chloride resin particles or vinyl chloride resin fine particles in a water tank and then using the device indicated below to measure and analyze a light diffraction-scattering intensity distribution, and thereby measure particle diameters and a volume-based particle diameter distribution.

Device: Laser diffraction particle size analyzer (SALD-2300, produced by Shimadzu Corporation)
Measurement method: Laser diffraction and scattering
Measurement range: 0.017 μm to 2500 μm
Light source: Semiconductor laser (wavelength 680 nm, output 3 mW).

<Tensile Elongation at Normal Temperature>

The tensile elongation of the vinyl chloride resin molded product was evaluated by measuring the tensile breaking elongation at normal temperature for each of an initial state (after molding and before heating) and a state after heating (heat aging test), as follows.

«Initial»

The obtained vinyl chloride resin molded sheet was punched with a No. 1 dumbbell prescribed by JIS K6251, and the tensile breaking elongation (%) at a normal temperature of 23° C. was measured in accordance with JIS K7161 at a tension rate of 200 mm/minute. Higher tensile breaking elongation indicates better tensile elongation of the vinyl chloride resin molded product in the initial state (after molding and before heating).

«After Heating (Heat Aging Test)»

A laminate lined with a foamed polyurethane layer was used as a sample. The sample was placed in an oven, and heated for 100 hours at a temperature of 130° C. Thereafter, the foamed polyurethane layer was peeled from the heated sample, to obtain a vinyl chloride resin molded sheet alone. The tensile breaking elongation (%) of the vinyl chloride resin molded sheet after 100 hours heating was then measured under the same conditions as in the initial state. Higher tensile breaking elongation indicates better tensile elongation of the vinyl chloride resin molded product after heating (heat aging test).

<Coefficient of Dynamic Friction>

The surface stickiness of the vinyl chloride resin molded product was evaluated by measuring the coefficient of dynamic friction as follows.

Specifically, using a feeling tester (product name "TL201Ts" produced by Trinity-Lab Inc.), a tactile contact was brought into contact with the vinyl chloride resin molded sheet before formation of the laminate under the conditions of load: 50 g, speed: 10 mm/sec, test range: 50 mm, measurement range: 30 mm except the front and rear 10 mm parts of the test range in a measurement environment of a temperature of 23° C. and a relative humidity of 50%, to measure the coefficient of dynamic friction of the sheet surface.

<Fluff Adhesiveness>

The obtained laminate lined with a foamed polyurethane molded product was cut to a size of 170 mm×300 mm, as a test piece. On the vinyl chloride resin molded product side of the test piece, any 20 locations subjected to color difference measurement were set beforehand. In the 20 locations, the lightness (L value) of the (vinyl chloride resin molded product side) surface of the test piece before a wear test was measured using a color-difference meter (product name "CR-400" produced by Konica Minolta Sensing, Inc.).

Next, the sample piece was put on a sample table of a Gakushin-type wear tester (product name "RT-200" produced by Daiei Kagaku Seiki Mfg. Co., Ltd.) with the vinyl chloride resin molded product side up. A load of 500 g was attached to the wear tester so as to place a total load of 500 g on the test piece. After this, a paper towel (product name "COMFORT" produced by Nippon Paper Crecia Co., Ltd.) was attached to the tip of the wear tester, and the attached paper towel was reciprocated 10 times in a state of being in contact with the vinyl chloride resin molded product-side surface of the test piece, to cause the test piece surface and the paper towel to be in contact with each other. In the predetermined 20 locations on the vinyl chloride resin molded product of the test piece, the lightness (L value) of the (vinyl chloride resin molded product side) surface of the test piece after the wear test was measured using the same color-difference meter as above. The average value of the differences in lightness before and after the wear test (ΔL value=the L value after the wear test–the L value before the wear test) in the 20 locations was then calculated. A smaller average value of the ΔL values indicates lower fluff adhesiveness of the vinyl chloride resin molded product and a lower likelihood of a fiber residue adhering to the molded product surface.

<Change in Surface Glossiness>

The obtained vinyl chloride resin composition was sprinkled onto a textured mold that was heated to a temperature of 260° C. and, after being left to melt for a given time of about 10 seconds to 20 seconds, excess vinyl chloride resin composition was shaken off. Next, the textured mold sprinkled with the vinyl chloride resin composition was placed in an oven set to a temperature of 270° C. and, once 60 seconds had passed from the placement, was cooled with cooling water. Once the mold had cooled to 50° C., a vinyl chloride resin molded sheet of 150 mm×70 mm×1 mm was removed from the mold as a vinyl chloride resin molded product (first shot). For the vinyl chloride resin molded sheet obtained in the first shot, the glossiness of its surface in contact with the mold was measured using a glossmeter (product name "GP-60A" produced by Tokyo Denshoku Co., Ltd., angle: 60°).

Following this, the same operation as above was repeated continuously to the 50th shot, using the mold used in the first shot again. Thus, 50 vinyl chloride resin molded sheets were continuously formed by the same method as above. For the vinyl chloride resin molded sheet obtained in the 50th shot, the glossiness of its surface in contact with the mold was measured by the same method as in the first shot. The difference in measured glossiness (the glossiness in the 50th shot–the glossiness in the first shot) was then calculated. A smaller glossiness difference indicates a smaller change in the surface glossiness of the molded product in the case of continuously forming vinyl chloride resin molded products. A smaller glossiness difference also indicates a lower likelihood of metallic contamination of the mold used and better continuous formability of vinyl chloride resin molded products.

Example 1

<Production of Vinyl Chloride Resin Composition>

Ingredients shown in Table 1 with the exception of plasticizers (trimellitate and epoxidized soybean oil) and vinyl chloride resin fine particles used as a dusting agent were added into a Henschel mixer and mixed. The plasticizers were all added to the mixture after increasing the temperature of the mixture to 80° C., and the mixture was further heated to be dried up (i.e., the mixture changed to a dry state through absorption of the plasticizers by vinyl chloride resin particles used as vinyl chloride resin). Thereafter, once the dried-up mixture had been cooled to a temperature of 100° C. or lower, the vinyl chloride resin fine particles used as the dusting agent were added to the mixture to yield a vinyl chloride resin composition.

The change in the surface glossiness of the resultant vinyl chloride resin composition was measured by the above-mentioned method. The results are shown in Table 1.

<Formation of Vinyl Chloride Resin Molded Product>

The resultant vinyl chloride resin composition was sprinkled onto a textured mold that was heated to a temperature of 250° C. and, after being left to melt for a given time of about 10 seconds to 20 seconds, excess vinyl chloride resin composition was shaken off. Next, the textured mold sprinkled with the vinyl chloride resin composition was placed in an oven set to a temperature of 200° C. and, once 60 seconds had passed from the placement, was cooled with cooling water. Once the mold had cooled to 40° C., a vinyl chloride resin molded sheet of 145 mm×175 mm×1 mm was removed from the mold as a vinyl chloride resin molded product.

The tensile elongation at normal temperature in the initial state (after molding and before heating) and the coefficient of dynamic friction of the resultant vinyl chloride resin molded sheet were measured and calculated by the above-mentioned methods.

<Formation of Laminate>

Two obtained vinyl chloride resin molded sheets were placed in a mold of 200 mm×300 mm×10 mm such as not to overlap one another and with the textured surface underneath.

Separately, a polyol mixture was obtained by mixing 50 parts of a propylene glycol PO (propylene oxide)/EO (ethylene oxide) block adduct (hydroxyl value 28, terminal EO unit content 10%, internal EO unit content 4%), 50 parts of a glycerin PO/EO block adduct (hydroxyl value 21, terminal EO unit content 14%), 2.5 parts of water, 0.2 parts of an ethylene glycol solution of triethylenediamine (product name: TEDA-L33 produced by Tosoh Corporation), 1.2 parts of triethanolamine, 0.5 parts of triethylamine, and 0.5 parts of a foam stabilizer (product name: F-122 produced by Shin-Etsu Chemical Co., Ltd.). The obtained polyol mixture was mixed with polymethylene polyphenylene polyisocyanate (polymeric MDI) in a ratio determined to give an isocyanate index of 98, to prepare a mixed solution. The prepared mixed solution was poured onto each of the two vinyl chloride resin molded sheets that had been placed in the mold as described above. Thereafter, the mold was covered with a 348 mm×255 mm×10 mm aluminum plate to seal the mold. After the mold had been sealed for 5 minutes, a laminate formed by the vinyl chloride resin molded sheet (thickness: 1 mm) as a surface skin lined with a foamed polyurethane molded product (thickness: 9 mm, density: 0.18 g/cm$^3$) was formed in the mold.

The formed laminate was then removed from the mold, and the tensile elongation at normal temperature after heating (heat aging test) and the fluff adhesiveness were measured and calculated by the above-mentioned methods. The results are shown in Table 1.

Example 2

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1.

The measurement and calculation were performed by the same methods as in Example 1. The results are shown in Table 1.

Example 3

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1.

The measurement and calculation were performed by the same methods as in Example 1, except fluff adhesiveness. The results are shown in Table 1.

Example 4

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1.

The measurement and calculation were performed by the same methods as in Example 1. The results are shown in Table 1.

Example 5

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, using silicone oil B having a different weight reduction rate from silicone oil A shown in Table 1.

The measurement and calculation were performed by the same methods as in Example 1. The results are shown in Table 1.

Example 6

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, using silicone oil B having a different weight reduction rate from silicone oil A shown in Table 1.

The measurement and calculation were performed by the same methods as in Example 1. The results are shown in Table 1.

Comparative Example 1

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, without using silicone oil.

The measurement and calculation were performed by the same methods as in Example 1. The results are shown in Table 1.

Comparative Example 2

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, using silicone oil C having a different weight reduction rate from silicone oil A shown in Table 1.

The measurement and calculation were performed by the same methods as in Example 1. The results are shown in Table 1.

Comparative Example 3

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, using silicone oil C having a different weight reduction rate from silicone oil A shown in Table 1.

The measurement and calculation were performed by the same methods as in Example 1, except fluff adhesiveness. The results are shown in Table 1.

Comparative Example 4

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, without using silicone oil.

The measurement and calculation were performed by the same methods as in Example 1, except fluff adhesiveness. The results are shown in Table 1.

Comparative Example 5

A vinyl chloride resin composition, a vinyl chloride resin molded sheet, and a laminate were produced in the same way as in Example 1 with the exception that, in the preparation of the vinyl chloride resin composition, the ingredients were changed as shown in Table 1, without using silicone oil.

The measurement and calculation were performed by the same methods as in Example 1, except fluff adhesiveness. The results are shown in Table 1.

| | | | Example 1 | Example 2 | Example 3 | Example 4 | Example 5 | Example 6 |
|---|---|---|---|---|---|---|---|---|
| Vinyl chloride resin composition | Substrate | Vinyl chloride resin particles[1] [parts by mass] | — | — | — | 100 | — | — |
| | | Vinyl chloride resin particles[2] [parts by mass] | 100 | 100 | 100 | — | 100 | 100 |
| | | Vinyl chloride resin particles[3] [parts by mass] | — | — | — | — | — | — |
| | | Vinyl chloride resin particles[4] [parts by mass] | — | — | — | — | — | — |
| | Plasticizer | Trimellitate[5] [parts by mass] | 100 | 95 | 95 | 90 | 95 | 95 |
| | | Epoxidized soybean oil[6] [parts by mass] | 2 | 2 | 2 | 2 | 2 | 2 |
| | Stabilizer | Perchloric acid-introduced hydrotalcite[7] [parts by mass] | 2.74 | 1.37 | 1.37 | 1.82 | 1.37 | 1.37 |
| | | Zeolite[8] [parts by mass] | 1.45 | 0.73 | 0.73 | 0.97 | 0.73 | 0.73 |
| | | β-diketone[9] [parts by mass] | 0.29 | 0.15 | 0.15 | 0.20 | 0.15 | 0.15 |
| | | Zinc stearate[10] [parts by mass] | 0.12 | 0.06 | 0.06 | 0.08 | 0.06 | 0.06 |
| | Mold release agent | 12-hydroxystearic acid[11] [parts by mass] | 0.1 | 0.1 | 0.1 | 0.1 | 0.1 | 0.1 |
| | Silicone oil | Silicone oil A[12] (unmodified, kinematic viscosity: $5 \times 10^3$ cSt, weight reduction rate: 0.3 mass %/260° C.) [parts by mass] | 0.40 | 0.60 | 1.00 | 0.40 | — | — |
| | | Silicone oil B[13] (higher fatty acid amide-modified, waxy at 25° C. and normal pressure, weight reduction rate: 5.0 mass %/260° C.) [parts by mass] | — | — | — | — | 0.40 | 0.20 |
| | | Silicone oil C[14] (hydroxy group-modified, kinematic viscosity 60 cSt, weight reduction rate: 8.0 mass %/260° C.) [parts by mass] | — | — | — | — | — | — |
| | Dusting agent | Vinyl chloride fine particle[15] [parts by mass] | 6 | 6 | 6 | 6 | 6 | 6 |
| | | Vinyl chloride fine particles[16] [parts by mass] | 6 | 6 | 6 | 6 | 6 | 6 |
| | | Vinyl chloride fine particles[17] [parts by mass] | — | — | — | — | — | — |
| | Other additives | Carbon black pigment[18] [parts by mass] | 4.25 | 4.12 | 4.12 | 4.03 | 4.12 | 4.12 |
| | Content of plasticizer [parts by mass vs. 100 parts by mass of vinyl chloride resin] | | 91.1 | 86.6 | 86.6 | 82.1 | 86.6 | 86.6 |
| | Content of silicone oil [parts by mass vs. 100 parts by mass of plasticizer] | | 0.39 | 0.62 | 1.03 | 0.43 | 0.41 | 0.21 |
| Evaluation category | Tensile elongation at normal temperature (23° C.) | Initial [%] | 390 | 390 | 390 | 380 | 390 | 390 |
| | | After heating (130° C. × 100 hr) [%] | 360 | 350 | 350 | 340 | 350 | 350 |
| | Surface stickiness (coefficient of dynamic friction at 23° C.) [—] | | 0.67 | 0.58 | 0.57 | 0.58 | 0.48 | 0.48 |
| | Fluff adhesiveness (ΔL value (after test − before test)) [—] | | 2.2 | 1.7 | * | 2.0 | 1.4 | 1.5 |
| | Change in surface glossiness (difference in glossiness (50th shot − 1st shot) [—] | | 0.0 | 0.0 | 0.1 | 0.0 | 0.0 | 0.0 |

-continued

|  |  |  | Comparative Example 1 | Comparative Example 2 | Comparative Example 3 | Comparative Example 4 | Comparative Example 5 |
|---|---|---|---|---|---|---|---|
| Vinyl chloride resin composition | Substrate | Vinyl chloride resin particles[1] [parts by mass] | — | — | — | 100 | 100 |
|  |  | Vinyl chloride resin particles[2] [parts by mass] | — | — | — | — | — |
|  |  | Vinyl chloride resin particles[3] [parts by mass] | — | 100 | 100 | — | — |
|  |  | Vinyl chlorite resin particles[4] [parts by mass] | 100 | — | — | — | — |
|  | Plasticizer | Trimellitate[5] [parts by mass] | 115 | 110 | 110 | 90 | 70 |
|  |  | Epoxidized soybean oil[6] [parts by mass] | 5 | 5 | 5 | 5 | 5 |
|  | Stabilizer | Perchloric acid-introduced hydrotalcite[7] [parts by mass] | 4.56 | 4.56 | 4.56 | 2.74 | 2.74 |
|  |  | Zeolite[8] [parts by mass] | 2.42 | 2.42 | 2.42 | 1.45 | 1.45 |
|  |  | β-diketone[9] [parts by mass] | 0.49 | 0.49 | 0.49 | 0.29 | 0.29 |
|  |  | Zinc stearate[10] [parts by mass] | 0.20 | 0.20 | 0.20 | 0.12 | 0.12 |
|  | Mold release agent | 12-hydroxystearic acid[11] [parts by mass] | 0.4 | 0.4 | 0.4 | 0.3 | 0.3 |
|  | Silicone oil | Silicone oil A[12] (unmodified, kinematic viscosity: $5 \times 10^3$ cSt, weight reduction rate: 0.3 mass %/260° C.) [parts by mass] | — | — | — | — | — |
|  |  | Silicone oil B[13] (higher fatty acid amide-modified, waxy at 25° C. and normal pressure, weight reduction rate: 5.0 mass %/260° C.) [parts by mass] | — | — | — | — | — |
|  |  | Silicone oil C[14] (hydroxy group-modified, kinematic viscosity 60 cSt, weight reduction rate: 8.0 mass %/260° C.) [parts by mass] | — | 0.40 | 1.00 | — | — |
|  | Dusting agent | Vinyl chloride fine particle[15] [parts by mass] | 20 | 10 | 10 | 13 | 13 |
|  |  | Vinyl chloride fine particles[16] [parts by mass] | — | — | — | — | — |
|  |  | Vinyl chloride fine particles[17] [parts by mass] | — | 10 | 10 | — | — |
|  | Other additives | Carbon black pigment[18] [parts by mass] | 4.82 | 4.82 | 4.82 | 4.82 | 4.82 |
|  | Content of plasticizer [parts by mass vs. 100 parts by mass of vinyl chloride resin] |  | 100.0 | 95.8 | 95.8 | 84.1 | 66.4 |
|  | Content of silicone oil [parts by mass vs. 100 parts by mass of plasticizer] |  | — | 0.35 | 0.87 | — | — |
| Evaluation category | Tensile elongation at normal temperature (23° C.) | Initial [%] | 380 | 390 | 390 | 350 | 120 |
|  |  | After heating (130° C. × 100 hr) [%] | 340 | 340 | 340 | 320 | 40 |
|  | Surface stickiness (coefficient of dynamic friction at 23° C.) [—] |  | 1.24 | 0.73 | 0.68 | 0.70 | 0.53 |
|  | Fluff adhesiveness (ΔL value (after test − before test)) [—] |  | 4.9 | 2.5 | * | * | * |
|  | Change in surface glossiness (difference in glossiness (50th shot − 1st shot) [—] |  | 0.0 | 0.4 | 3.7 | 0.0 | 0.0 |

* No measurement
[1] product name "ZEST ® 1000Z" (ZEST is a registered trademark in Japan, other countries, or both) produced by Shin Dai-ichi Vinyl Corporation (suspension polymerization, average degree of polymerization: 1000, average particle diameter: 140 μm)
[2] product name "ZEST ® 1300S" produced by Shin Dai-ichi Vinyl Corporation (suspension polymerization, average degree of polymerization: 1300, average particle diameter: 115 μm)
[3] product name "ZEST ® 1700ZI" produced by Shin Dai-ichi Vinyl Corporation (suspension polymerization, average degree of polymerization: 1700, average particle diameter: 130 μm)
[4] product name "ZEST ® 2000Z" produced by Shin Dai-ichi Vinyl Corporation (suspension polymerization, average degree of polymerization: 2000, average particle diameter: 130 μm)
[5] product name "TRIMEX N-08" produced by Kao Corporation
[6] product name "ADK CIZER O-130S" produced by ADEKA Corporation
[7] product name "ALCAMIZER 5" produced by Kyowa Chemical Industry Co., Ltd.
[8] product name "MIZUKALIZER DS" produced by Mizusawa Industrial Chemicals, Ltd.
[9] product name "Karenz DK-1" produced by Showa Denko K.K.
[10] product name "SAKAI SZ2000" produced by Sakai Chemical Industry Co., Ltd.
[11] product name "ADK STAB LS-12" produced by ADEKA Corporation
[12] product name "KF-96-5000cs" produced by Shin-Etsu Silicone (unmodified silicone oil, weight reduction rate at 200° C.: 0.3 mass %, weight reduction rate at 260° C.: 0.3 mass %, weight reduction rate at 300° C.: 0.6 mass %, kinematic viscosity: $5 \times 10^3$ cSt)
[13] product name "KF-3935" produced by Shin-Etsu Silicone (higher fatty acid amide-modified silicone oil, weight reduction rate at 200° C. 1.6 mass %, weight reduction rate at 260° C.: 5.0 mass %, weight reduction rate at 300° C.: 9.2 mass %, waxy at 25° C. and normal pressure)
[14] product name "KF-9701" produced by Shin-Etsu Silicone (hydroxyl group both end-modified silicone oil, weight reduction rate at 200° C.: 3.5 mass %, weight reduction rate at 260° C.: 8.0 mass %, weight reduction rate at 300° C.: 11.6 mass %, kinematic viscosity: 60 cSt)
[15] product name "ZEST PQLTX" produced by Shin Dai-ichi Vinyl Corporation (emulsion polymerization, average degree of polymerization: 800, average particle diameter: 1.8 μm)
[16] product name "Ryuron paste ® 860" (Ryuron paste is a registered trademark in Japan, other countries, or both) produced by Tosoh Corporation (emulsion polymerization, average degree of polymerization: 1600, average particle diameter: 1.6 μm)
[17] product name "Ryuron paste ® 761" produced by Tosoh Corporation (emulsion polymerization, average degree of polymerization: 2100, average particle diameter: 1.6 μm)
[18] product name "DA PX 1720(A) Black" produced by Dainichiseika Color and Chemicals Mfg. Co., Ltd.

As can be understood from Table 1, in the vinyl chloride resin molded product obtained using the vinyl chloride resin composition of each of Examples 1 to 6 prepared using (a) the vinyl chloride resin, (b) the plasticizer, and (c) the silicone oil which is predetermined silicone oil with the content of (b) the plasticizer relative to (a) the vinyl chloride resin and the content of (c) the silicone oil relative to (b) the plasticizer being predetermined amounts or more, an increase in surface gloss was suppressed while ensuring favorable tensile elongation and low surface stickiness.

In Comparative Examples 1 and 4 without using silicone oil, the coefficient of dynamic friction of the vinyl chloride resin molded product was high, and the surface stickiness was high. In Comparative Examples 2 and 3 using a silicone oil having a weight reduction rate more than a predetermined value, the surface stickiness of the vinyl chloride resin molded product was not reduced sufficiently, and the molded product surface gloss increased with continuous formation of molded products. In Comparative Example 5 in which the content of the plasticizer relative to 100 parts by mass of the vinyl chloride resin was less than 80 parts by mass, no problem of surface stickiness of the vinyl chloride resin molded product was seen, but the tensile elongation deteriorated noticeably.

INDUSTRIAL APPLICABILITY

It is therefore possible to provide a vinyl chloride resin composition with which an increase in the surface gloss of the resultant vinyl chloride resin molded product can be suppressed even in the case of repeating the molding of a vinyl chloride resin molded product using the same mold, and also favorable tensile elongation and low surface stickiness of the resultant vinyl chloride resin molded product can be ensured.

It is also possible to provide a vinyl chloride resin molded product without an increase in surface gloss while ensuring favorable tensile elongation and low surface stickiness, and a laminate including the vinyl chloride resin molded product.

The invention claimed is:

1. A vinyl chloride resin composition comprising:
   (a) a vinyl chloride resin;
   (b) a plasticizer; and
   (c) a silicone oil,
   wherein a content of (b) the plasticizer relative to 100 parts by mass of (a) the vinyl chloride resin is 80 parts by mass or more,
   a content of (c) the silicone oil relative to 100 parts by mass of (b) the plasticizer is 0.01 parts by mass or more,
   (c) the silicone oil is a fatty acid amide group-modified silicone oil,
   a weight reduction rate of (c) the silicone oil at a temperature of 260° C. in thermogravimetric analysis is 7.0 mass % or less,
   (a) the vinyl chloride resin contains vinyl chloride resin particles having a particle diameter of at least 30 μm and vinyl chloride resin fine particles having a particle diameter of less than 30 μm,
   an average degree of polymerization of the vinyl chloride resin particles is 500 or more and 1300 or less,
   an average degree of polymerization of the vinyl chloride resin fine particles is 500 or more and 5000 or less, and
   (b) the plasticizer includes a primary plasticizer and a secondary plasticizer.

2. The vinyl chloride resin composition according to claim 1,
   wherein the content of (c) the silicone oil relative to 100 parts by mass of (b) the plasticizer is 1.2 parts by mass or less.

3. A vinyl chloride resin molded product obtainable through molding of the vinyl chloride resin composition according to claim 1.

4. The vinyl chloride resin molded product according to claim 3 used as a surface skin of an automobile instrument panel.

5. A laminate comprising:
   a foamed polyurethane molded product; and
   the vinyl chloride resin molded product according to claim 3.

6. The vinyl chloride resin composition according to claim 1,
   wherein a percentage content of the vinyl chloride resin particles in (a) the vinyl chloride resin relative to 100 mass % of (a) the vinyl chloride resin is 70 mass % or more and 99 mass % or less, and
   a percentage content of the vinyl chloride resin fine particles in (a) the vinyl chloride resin relative to 100 mass % of (a) the vinyl chloride resin is 1 mass % or more and 30 mass % or less.

7. The vinyl chloride resin composition according to claim 1,
   wherein the primary plasticizer is selected from a group consisting of a linear trimellitate, a branched trimellitate, a linear pyromellitate, a branched pyromellitate, a phthalic acid derivative, an isophthalic acid derivative, a tetrahydrophthalic acid derivative, an adipic acid derivative, an azelaic acid derivative, a sebacic acid derivative, a maleic acid derivative, a fumaric acid derivative, citric acid derivative, an itaconic acid derivative, an oleic acid derivative, a ricinoleic acid derivative, a stearic acid derivative, an other fatty acid derivative, phosphoric acid derivative, a glycol derivative, a glycerin derivative, an epoxy derivative, polyester plasticizer, and a mixture thereof, and
   the secondary plasticizer is selected from a group consisting of an epoxidized vegetable oil, a chlorinated paraffin, a fatty acid ester of glycol, butyl epoxy stearate, phenyl oleate, and methyl dihydroabietate.

8. The vinyl chloride resin composition according to claim 1,
   wherein the primary plasticizer contains at least one of a linear trimellitate and a branched trimellitate, and
   a content of (b) the plasticizer relative to 100 parts by mass of (a) the vinyl chloride resin is 90 parts by mass or less.

* * * * *